Figure 1:
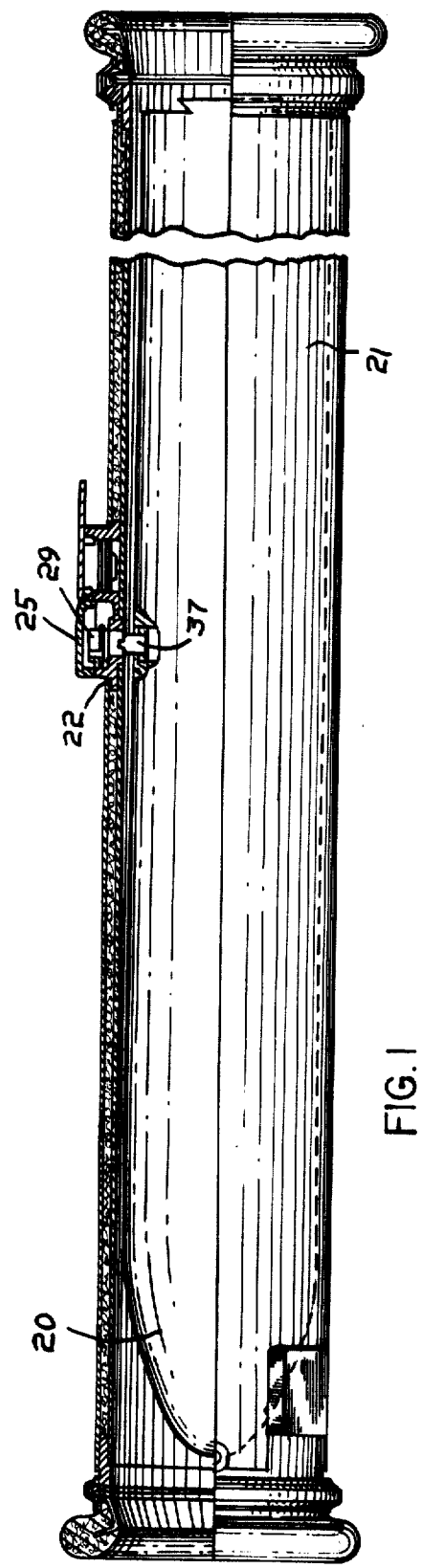

United States Patent

[11] 3,602,091

| [72] | Inventors | Gilbert G. Fryklund<br>Winchester;<br>Richard A. Emanuel, Dedham, both of,<br>Mass. |
|---|---|---|
| [21] | Appl. No. | 794,902 |
| [22] | Filed | Jan. 29, 1969 |
| [45] | Patented | Aug. 31, 1971 |
| [73] | Assignee | Norris Industries, Inc.<br>Los Angeles, Calif. |

[54] TWO-STAGE HOLDBACK DEVICES AND MEANS FOR OPERATING THEM
11 Claims, 17 Drawing Figs.

[52] U.S. Cl. ............................................. 89/1.806,
89/1.816
[51] Int. Cl. ...................................................... F41f 3/04
[50] Field of Search .......................................... 89/1.806,
1.807, 1.808, 1.8, 1.816

[56] References Cited
UNITED STATES PATENTS
3,040,629  6/1962  Duncan et al. ................. 89/1.806
3,187,631  6/1965  Cromwell et al. ............. 89/1.806

*Primary Examiner*—Samuel W. Engle
*Attorney*—Abbott Spear

ABSTRACT: The invention is illustrated as a two-stage holdback device in a container-missile combination, the device consisting of missile and container supported rotatable members having complemental tongue-and-groove portions held connected against lengthwise movement by shear means. The tongue-and-groove connection is disposed normally at right angles to the missile axis to provide resistance to shear forces of a high order and is disposed lengthwise of the container to yield to shear forces developing when the missile is fired. Operating means for rotating the members are also disclosed.

INVENTORS
GILBERT G. FRYKLUND
RICHARD A. EMANUEL

BY,
ATTORNEY

INVENTORS
GILBERT G. FRYKLUND
RICHARD A. EMANUEL

ATTORNEY

INVENTORS
GILBERT G. FRYKLUND
RICHARD A. EMANUEL
BY,
ATTORNEY

INVENTORS
GILBERT G. FRYKLUND
RICHARD A. EMANUEL
BY,

ATTORNEY

3,602,091

PATENTED AUG 31 1971

SHEET 6 OF 8

INVENTORS
GILBERT G. FRYKLUND
RICHARD A. EMANUEL

BY,

ATTORNEY

OUTER RING FIXED AT 0°
PIN FREE AT 0°
INNER RING FREE AT 0°

OUTER RING AT 0°
PIN DOWN AT $22\frac{1}{2}°$
INNER RING ROTATED 45°

OUTER RING AT 0°
PIN DOWN ALL WAY AT 45°
INNER RING ROTATED 90°

INVENTORS
GILBERT G. FRYKLUND
RICHARD A. EMANUEL
BY,
Albert Spear
ATTORNEY

3,602,091

TWO-STAGE HOLDBACK DEVICES AND MEANS FOR OPERATING THEM

The present invention relates to a two-stage holdback device adapted to be turned from one position to another to provide resistance to shear forces of two different magnitudes and to operating means therefor.

The invention is herein discussed with particular reference to container-missile combinations of the type wherein a missile is stored within and attached to a container as a final production step and is carried therein until the missile is fired. The thus packaged missile may be subjected to heavy shocks, particularly during shipment and delivery to the firing site, that represent a "g" load of a large order, 10,000 pounds, for example. When, however, the missile is to be launched from the container, the holdback mechanism must release in response to a substantially smaller "g" load, 450 pounds, for example.

The provision of a two-stage holdback device that will meet such contrasting shear requirements is the general objective of the invention, an objective attained by providing the container with a saddle overlying a hole opening through its side into its interior and the missile with a socket in its side which registers with the side opening when the missile is properly positioned within the container. The device consists of a member rotatably mounted in the saddle and a member rotatably mounted in the socket. The proximate ends of the members have a complemental tongue-and-groove connection held together by shear means against relative lengthwise movement when the shear forces are of a relatively small order. The members have a normal position in which the tongue-and-groove portions are transversely of the container thereby to provide means to resist shear forces lengthwise of the container that are of a relatively larger order.

Another objective of the invention is to provide a holdback device in which the members are movable away from each other with means operable to effect such separation of the members when the shear means is broken.

Another objective of the invention is to provide a device that may be inserted through the opening in the side of the container and threaded into the socket in the missile, an objective attained by providing a bushing dimensioned to be passed through the container opening and threaded into the socket. The bushing has a depending pin engageable by a drive pin protruding from the bottom of the missile-mounted member so that when the container-mounted member is turned in one direction the bushing is turned to secure it in its socket, the container-mounted member being turned in the other direction when the missile is to be prepared for firing.

A further objective of the invention is to provide an operator that can be quickly and easily actuated to turn the device accurately from its normal to its firing position.

Figure 2:
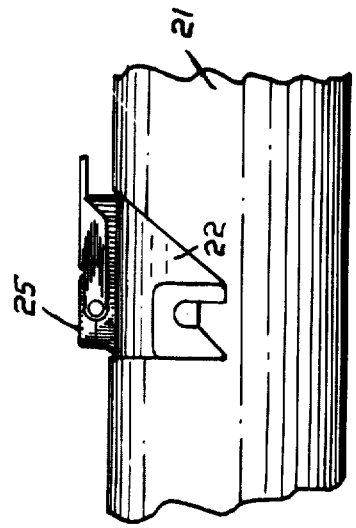
Figure 3:
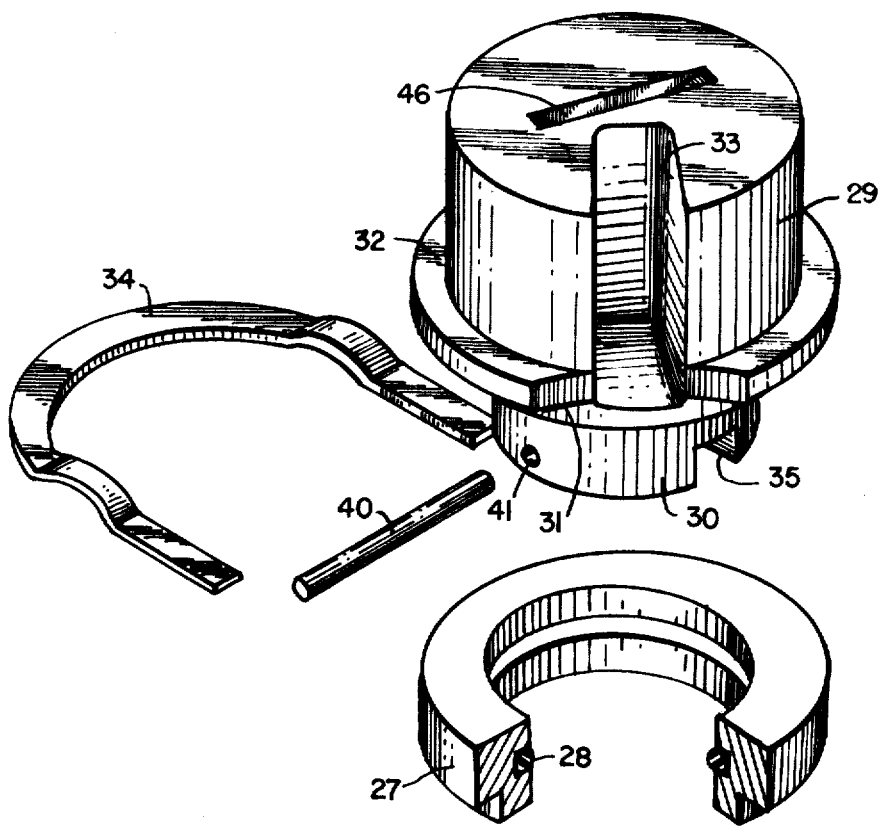
Figure 3:
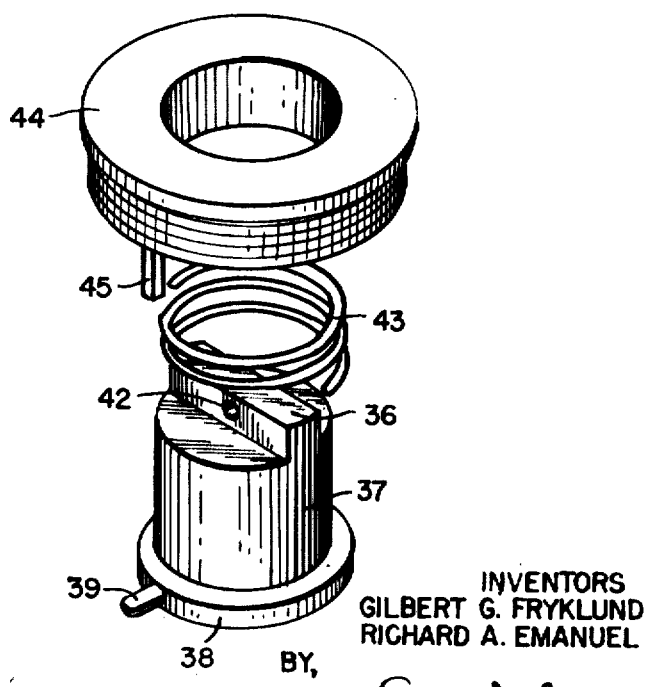
Figure 4:
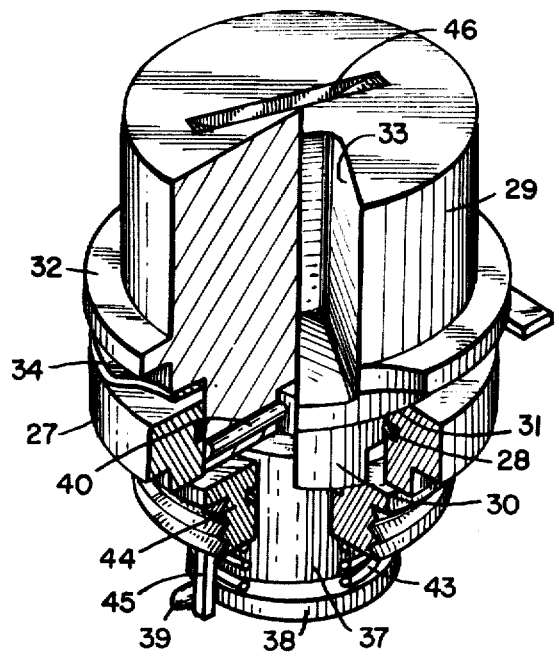
Figure 5:
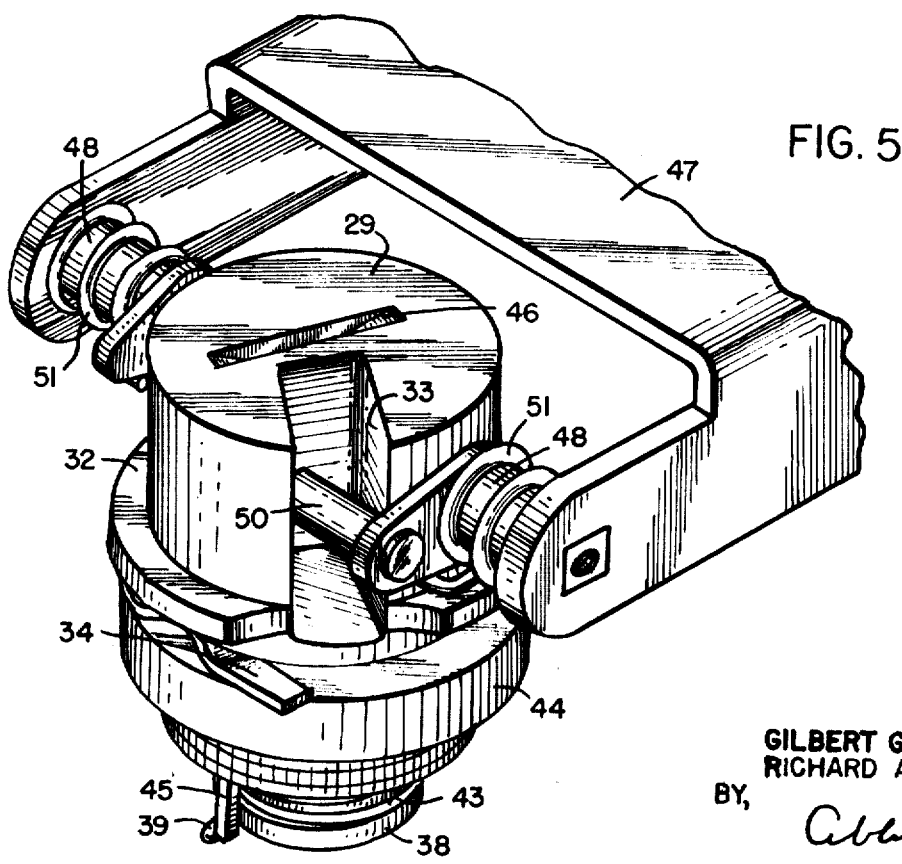
Figure 6:
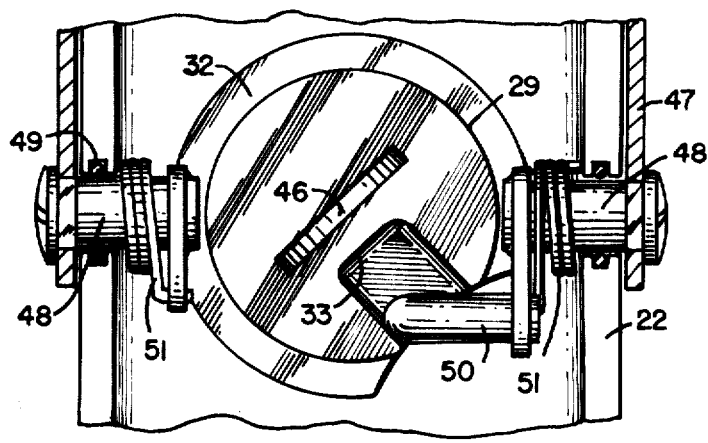
Figure 7:
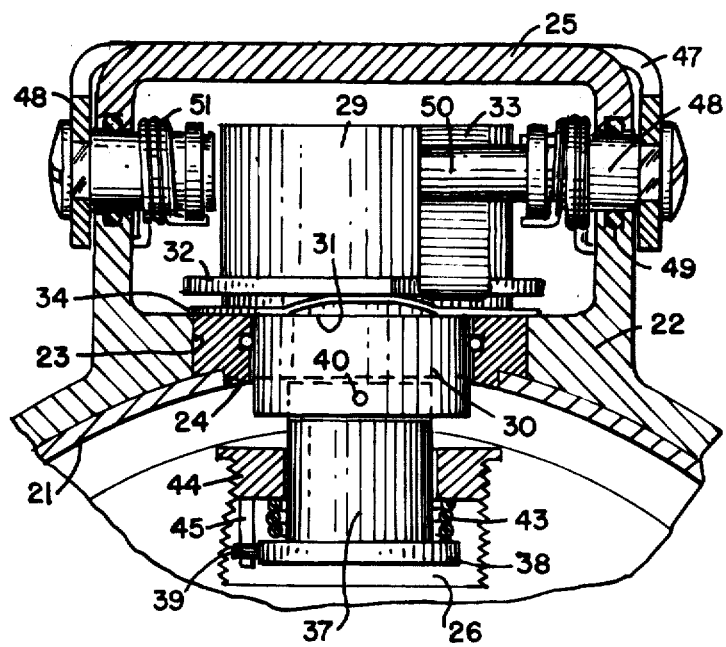
Figure 8:
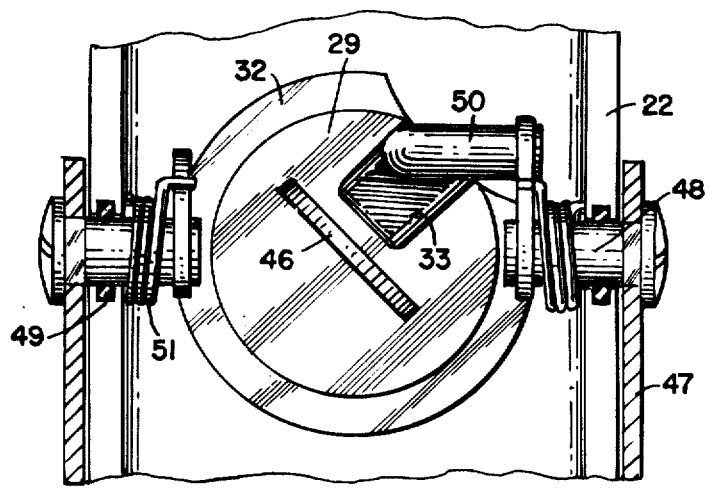
Figure 9:
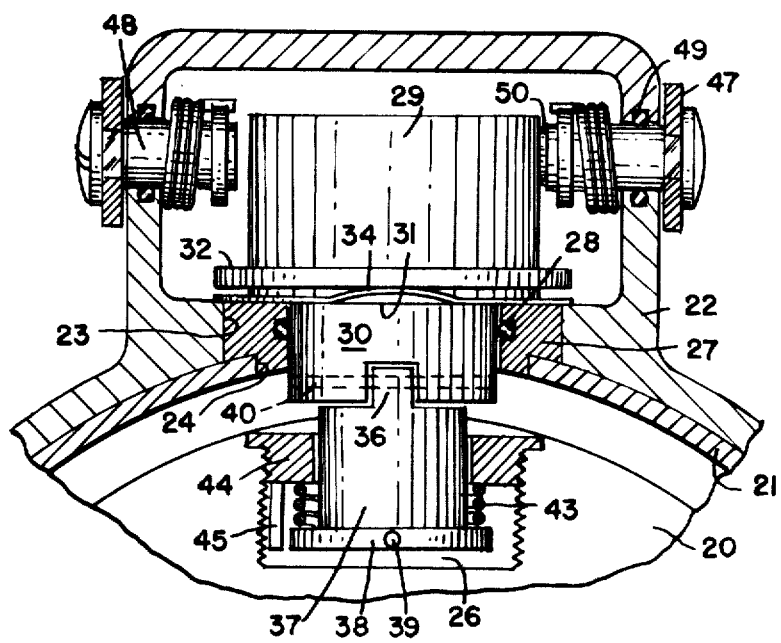
Figure 10:
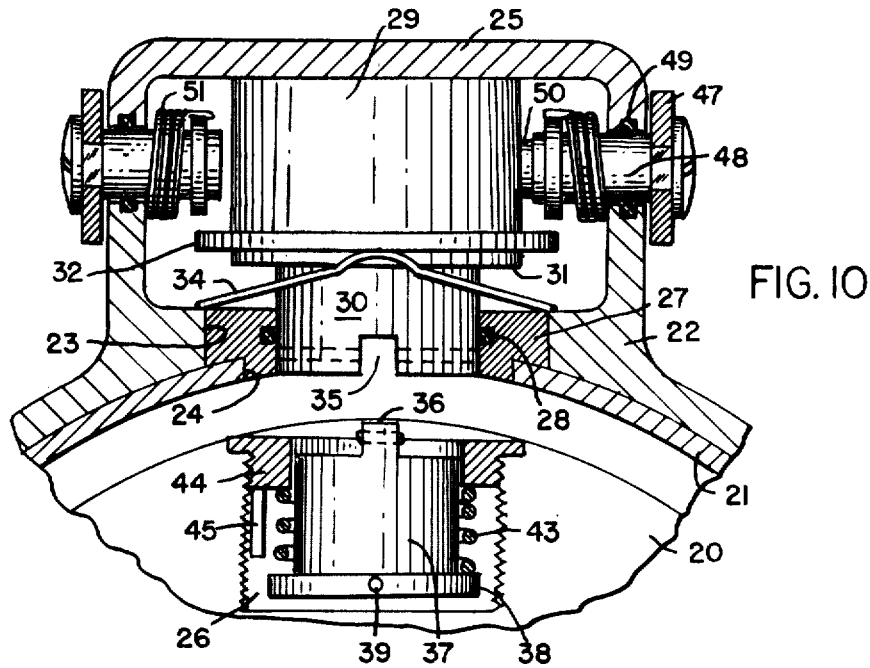
Figure 11:
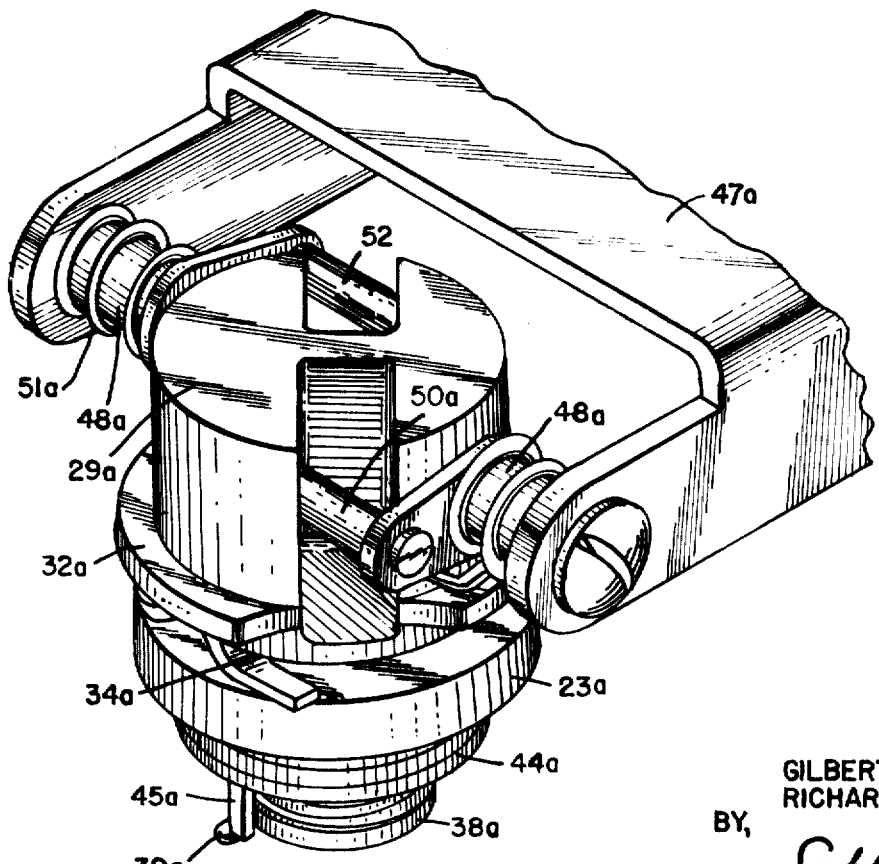
Figure 12:
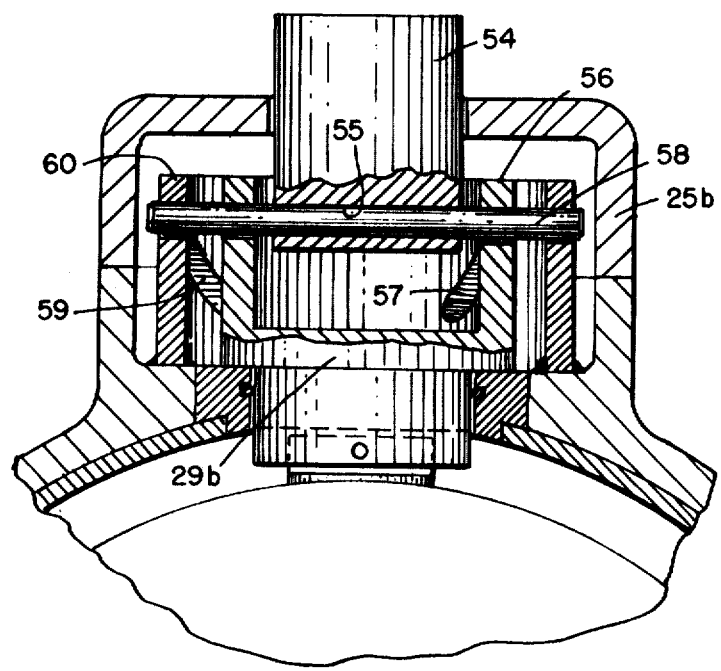
Figure 13:
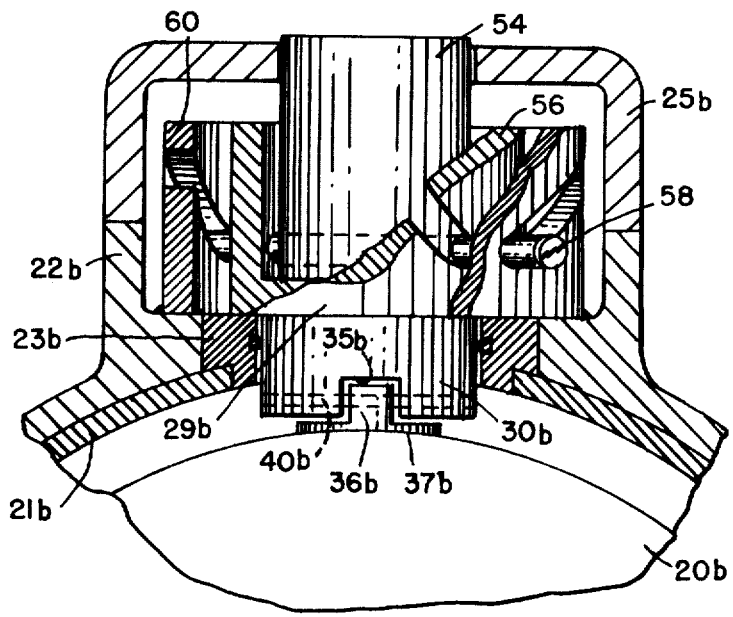

Yet another objective of the invention is to provide an operator or part rotating means having three concentric members, one member being held against rotation, the other members being rotatable with one of the rotatable members including a part to be turned from a first to a second position. One of the members is the actuator and has a transverse pin extending through diametrically disposed inclined slots in the other members. The slots of each member are of the same hand but opposite to that of the other. The actuator member is thus supported for axial movement and on such movement the slots of the two slotted members coact to effect the rotation of the part to an extent equal to the sum of the arcuate extent of a slot of each slotted member on movement of the actuator member equal to the axial extent of the slots of one of the slotted members. In the accompanying drawings, there are shown embodiments of the invention illustrative of these and other of its objectives, novel features, and advantages. In the drawings:

FIG. 1 is a side view of a container, the container being partly sectioned to show its missile, FIG. 2 is a fragmentary side view of the container showing the saddle, FIG. 3 is an exploded view showing in elevation the parts of the holdback device, FIG. 4 is a partly sectioned, perspective view of the assembly of the parts shown in FIG. 3, FIG. 5 is a perspective view of that assembly with the actuating handle attached, FIG. 6 is a top plan view of the saddle with the assembled device in place, FIG. 7 is a vertical cross section through the saddle with its cover attached, showing the device in its first position, FIG. 8 is a view similar to FIG. 6 but with the device turned through 90° into its second position, FIG. 9 is a view similar to FIG. 7 but with the device in its FIG. 8 position, FIG. 10 is a view similar to FIG. 9 but with the member carried by the missile and the member carried by the saddle in their separated, retracted positions, FIG. 11 is a perspective view of a handle and the saddle-mounted member of the device in accordance with another embodiment of the invention, FIG. 12 is a view similar to FIG. 7 illustrating another embodiment of the invention, FIG. 13 is a view of that embodiment with the device turned through 90°

Figure 14:
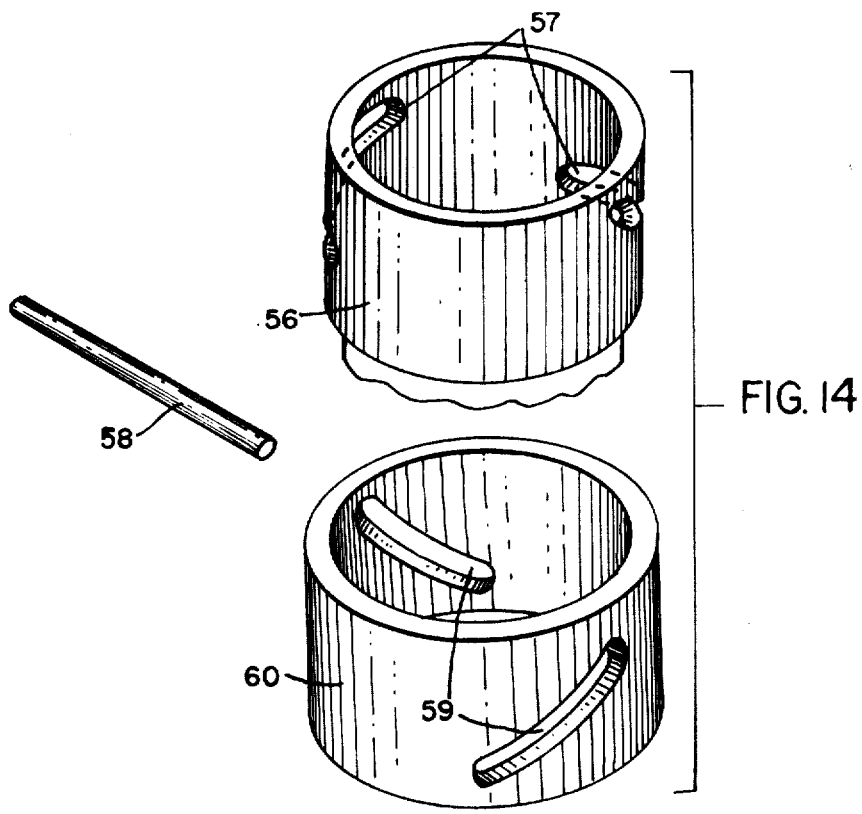

FIG. 14 is an exploded perspective view of certain of the parts of the device shown in FIGS. 12 and 13, and FIGS. 15A, 15B, and 15C are somewhat schematic views illustrating the operation of that device.

In FIG. 1, a missile, generally indicated at 20 is shown within a tubular container 21 in which it is carried throughout the production—stockpile—launch sequence. The container 21 has, as may best be seen in FIGS. 7, 9, and 10, a saddle 22 having a circular port 23 somewhat larger than and overlying a hole 24 in the container and provided with a cover 25 indicated as bonded thereto although it may, of course, be made removable. The missile 20 has a threaded socket 26 in its side which is in registry with the holes 23 and 24 when the missile 20 is correctly positioned within its container 21.

In accordance with the embodiment of the invention detailed in FIGS. 3–10, the two-stage holdback device by which the missile is connected to its container includes a shouldered bushing 27 dimensioned to fit the seat established by the holes 23 and 24 and having an O-ring seal 28. An outer shear member 29 has a depending portion 30 of reduced diameter extending through the bushing 27 and providing a shoulder 31 engageable with the bushing 27. The shear member 29 has a laterally projecting flange 32 whose ends terminate short of the bottom end of a vertical slot 33. A U-shaped leaf spring 34 is confined between the flange 32 and the bushing 27.

The inner end of the portion 30 is divided by a diametrically disposed channel or groove 35 which is dimensioned to slidably receive a rib or tongue 36 on the outer end of the inner shear member 37 at whose inner end there is a flange 38 having a laterally projecting drive pin 39. A shear pin 40 extends through aligned holes 41 and 42 transversely of the channel 35 and the tongue 36, respectively, thus connecting the outer and inner shear members as a unit with a helical spring 43 held compressed between a bushing 44 and the flange 38. The bushing 44 is threaded for entry into the socket 26 which is dimensioned to receive the inner shear member 37 within it when the spring 43 is free to retract it from its position shown in FIGS. 7 and 9. The lower bushing 44 is shown as having depending pin or tongue 45 disposed for engagement by the drive pin 39.

As the holdback device, as thus far described, is a unit, it is easily installed when the missile 20 is properly positioned within its container 21 as the bushing 44 is dimensioned for entry through the opening 23. Rotation of the upper shear member 29 results in torque being applied through the drive pin 39 and the pin 45 thus to thread the bushing 44 into its socket 26. To facilitate such installation, the upper end of the upper shear member 29 is shown as provided with a slot 46 to enable a screwdriver to be used in effecting the assembly.

When the holdback mechanism is secured in place, the tongue-and-groove interlock is transversely of the axis of the container and its missile and presents large enough shear surfaces to meet a "g" load that is higher than the foreseeable maximum to which the container and its missile could be subjected prior to firing.

In launch position, a much lower "g" load is wanted and this is obtainable by rotating the hold back device 90° in the direction opposite to that in which it was turned during installation so that the shear pin 40 determines the allowable "g" load and the means for so turning the mechanism will now be detailed.

In the embodiment of the invention shown in FIGS. 1–10, the actuator for the hold back mechanism consists of a handle 47 having the two transversely aligned pivots 48 mounted in and extending transversely through the sidewalls of the saddle 22 and sealed by O-ring seals 49. One pivot 48 includes a crankpin 50 entrant of the vertical groove 33 and both pivots are subject to springs 51 yieldably holding the handle 47 in the position in which the tongue and groove are disposed transversely of the container and its missile. When the handle 47 is swung forwardly through 180° to turn the tongue-and-groove connection 90° the pin 40 is subject to shear when the missile is fired.

In the embodiment of the invention illustrated by FIG. 11, an actuator handle is shown that is substantially identical to that previously described and, accordingly, the same reference numerals are used to designate corresponding parts but these are distinguished by the suffix addition A. In this embodiment, both pivots 48A carry cranks, the additional crank being indicated at 52 and set 180° from the crank 50A. The holdback mechanism is identical to the previously described except that the upper shear member 29A has two crank-receiving channels, the second channel being indicated at 53 and spaced relative to the channel 33A so as to receive the crank 52. As the cranks rotate equally but oppositely through 180° a balanced torque on the device is achieved.

In the embodiment of the invention illustrated by FIGS. 12–15C, the actuator is shown as consisting of a central cylindrical plunger member 54 having a transverse bore 55. The upper shear member 29B, which is otherwise like the upper shear member 29 has its upper end in the form of a cylindrical sleeve or ring 56 dimensioned to slidably receive the plunger 54 within it and provided with diametrically opposed inclined slots 57 of the same hand to receive a pin 58 extending through the bore 55 of the plunger 54 with its ends entrant of slots 59 in an outer sleeve 60 fixed to the saddle 22B of the container 21B. The slots 59 are diametrically opposed and inclined and are of the same hand but opposite to that of the slots 57.

Figure 15A:
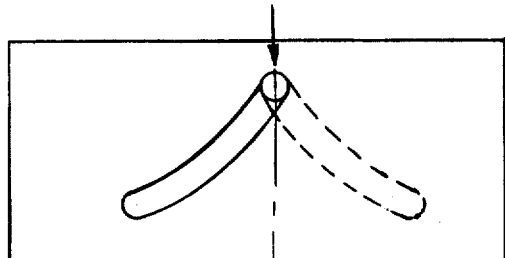
Figure 15B:
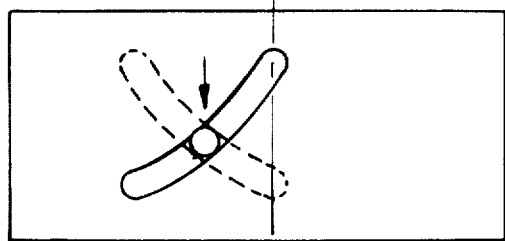
Figure 15C:
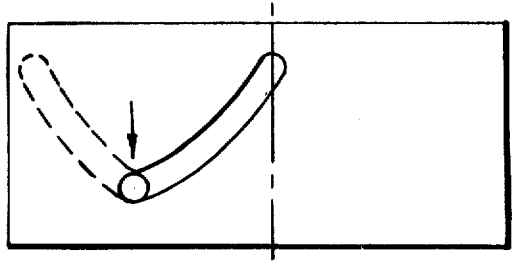

The slots 57 and 59 are 45° in length, circumferentially considered, and when the plunger 54 is depressed to the maximum extent, compare FIGS. 15A, 15B, and 15C, the pin 58 turns 45° while the upper shear member 29B is turned 90° to ready the missile 20 for firing. The arrangement affords the required rotation with a shorter stroke and less friction than would be possible with a single cam surface.

We claim:

1. A tubular container and missile combination including a two-stage holdback device connecting the missile to its container, said container including a saddle overlying a hole in its side opening into its interior, said missile having a socket in its side in registry with said opening when the missile is properly positioned within the container, said device comprising a member rotatably mounted in said saddle, a member rotatably mounted in said socket, one member having a groove dividing an end thereof, the other member including a tongue in said groove, and shear means connecting said tongue to a wall of said groove to oppose shear forces lengthwise of said groove that are of a relatively small order, said members being arranged to have a normal position with the tongue and groove transversely of the container and missile to provide means to resist shear forces lengthwise of the container that are of a relatively large order.

2. The container-missile combination of claim 1 and means connected to the saddle mounted member to rotate said members through 90° thus to expose the shear means to lengthwise shear forces.

3. The container-missile combination of claim 1 in which the members have operative positions in which the tongue-and-groove connection between them is exposed between the container and the missile, each member is movable into an inoperative position substantially free of such exposure when the shear means is broken, and spring means for each member yieldably urging it into its inoperative position.

4. The container-missile combination of claim 1 in which the saddle includes a part slidably and rotatably supporting the saddle-mounted member, the saddle-mounted member has a flange, and a spring confined between the flange and the part yieldably urging the saddle-mounted member away from the missile-mounted member.

5. The container-missile combination of claim 1 in which the missile-mounted member includes a flange, the missile includes a part within the socket slidably confining the missile-mounted member, and a spring confined between the flange and the part yieldably urging the missile-mounted member towards the bottom of the socket.

6. The container-missile combination of claim 1 in which the saddle has an opening and a part within the opening slidably and rotatably receives and supports the saddle-mounted member, the saddle-mounted member has a flange, and a spring confined between the flange and the part yieldably urges the saddle-mounted member away from the missile-mounted member, the missile-mounted member includes a flange, the missile includes a part dimensioned to pass through the saddle opening and threaded into the socket and slidably confining the missile-mounted member, a spring confined between the threaded part and the flange of the missile-mounted member yieldably urges the missile-mounted member towards the bottom of the socket, the threaded part includes a pin disposed towards the bottom of the socket and the flange includes a pin projecting for driving engagement with the pin of the threaded part thereby to enable the connected parts to be installed through the saddle opening when the missile is correctly positioned within the container.

7. The container-missile combination of claim 2 in which the rotating means includes a handle pivotally connected to the saddle and a connection with the member mounted in the saddle operative to rotate the parts when the handle is pivoted to a predetermined extent.

8. The container-missile combination of claim 7 in which the saddle-mounted member has a vertically extending channel and the handle has a crank entrant of the channel.

9. The container-missile combination of claim 7 in which the saddle-mounted member has a pair of diametrically opposed, vertically extending channels, and the handle includes cranks, one for each channel and entrant thereof, the cranks being offset by 180°.

10. The container-missile combination of claim 2 in which the rotating means includes cam means provided with an actuator member movable at right angles to the container axis.

11. The container-missile combination of claim 10 in which the cam means also includes a pair of ring members concentric with the actuator member, each ring member having diametrically opposed, inclined slots, the actuator member has a pin extending through the slots, the slots of each ring member being of the same hand but opposite to that of the other ring member, one member of the cam means being held against rotation and one member of the cam means being connected to the saddle-mounted member to be held against rotation.